(12) United States Patent
Yang et al.

(10) Patent No.: US 11,175,544 B2
(45) Date of Patent: Nov. 16, 2021

(54) STRETCHABLE ELECTROOPTICAL AND MECHANOOPTICAL DEVICES COMPRISING A LIQUID CRYSTAL CELL DISPOSED BETWEEN FIRST AND SECOND IONIC CONDUCTING GEL LAYERS

(71) Applicant: President and Fellows of Harvard College, Cambridge, MA (US)

(72) Inventors: Canhui Yang, Somerville, MA (US); Shuang Zhou, Somerville, MA (US); Zhigang Suo, Lexington, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 16/491,106

(22) PCT Filed: Mar. 7, 2018

(86) PCT No.: PCT/US2018/021302
§ 371 (c)(1),
(2) Date: Sep. 4, 2019

(87) PCT Pub. No.: WO2018/165264
PCT Pub. Date: Sep. 13, 2018

(65) Prior Publication Data
US 2020/0012140 A1    Jan. 9, 2020

Related U.S. Application Data

(60) Provisional application No. 62/468,073, filed on Mar. 7, 2017.

(51) Int. Cl.
*G02F 1/1343*    (2006.01)
*H01M 10/0565*    (2010.01)
(Continued)

(52) U.S. Cl.
CPC .... *G02F 1/13439* (2013.01); *H01M 10/0565* (2013.01); *G02F 1/0018* (2013.01);
(Continued)

(58) Field of Classification Search
CPC .... G02F 1/0018; G02F 1/15165; G02F 1/061; G02F 1/1525; G02F 2001/164; G02F 1/0128
See application file for complete search history.

(56) References Cited

U.S. PATENT DOCUMENTS

| 5,018,527 A | 5/1991 | Pfab et al. |
| 2008/0303981 A1* | 12/2008 | Fryer ................ G02F 1/133603 349/69 |

(Continued)

FOREIGN PATENT DOCUMENTS

| CN | 101178486 A * | 5/2008 | ............ G02F 1/025 |
| CN | 102037398 A | 4/2011 | |

(Continued)

OTHER PUBLICATIONS

Yang, C.H., Chen, B., Zhou, J., Chen, Y.M. and Suo, Z. (2016), Electroluminescence of Giant Stretchability. Adv. Mater., 28: 4480-4484. doi:10.1002/adma.201504031 (Year: 2016).*

(Continued)

*Primary Examiner* — Paul C Lee
(74) *Attorney, Agent, or Firm* — Wilmer Cutler Pickering Hale and Dorr LLP

(57) ABSTRACT

A stretchable electrooptical device includes a liquid crystal cell disposed between first and second ionic conducting gel layers; and first and second electronic conductors in electrical contact with the first and second ionic conducting gel layers, respectively, said first and second electronic conductors connectable to an external voltage source.

16 Claims, 14 Drawing Sheets

(51) Int. Cl.
G02F 1/00 (2006.01)
G09G 3/36 (2006.01)
G02F 1/1516 (2019.01)
G02F 1/061 (2006.01)
G02F 1/1333 (2006.01)
G02F 1/1523 (2019.01)

(52) U.S. Cl.
CPC ........ *G02F 1/061* (2013.01); *G02F 1/133305* (2013.01); *G02F 1/1525* (2013.01); *G02F 1/15165* (2019.01); *G09G 3/3655* (2013.01)

(56) References Cited

U.S. PATENT DOCUMENTS

| | | | | |
|---|---|---|---|---|
| 2009/0273737 | A1* | 11/2009 | Zhao | G02F 1/133602 349/69 |
| 2010/0134723 | A1* | 6/2010 | Evans | G02F 1/1334 349/69 |
| 2011/0180406 | A1 | 7/2011 | Hirshberg et al. | |
| 2011/0234084 | A1* | 9/2011 | Zhao | G02F 1/133603 313/483 |
| 2012/0043530 | A1 | 2/2012 | Badre et al. | |
| 2012/0078999 | A1 | 3/2012 | Andrew et al. | |
| 2014/0160623 | A1 | 6/2014 | Baer et al. | |
| 2015/0160475 | A1 | 6/2015 | Yang et al. | |
| 2016/0025669 | A1 | 1/2016 | Sun et al. | |

FOREIGN PATENT DOCUMENTS

| | | | | |
|---|---|---|---|---|
| CN | 102854689 A | * | 1/2013 | G02F 1/1533 |
| CN | 104215354 A | | 12/2014 | |
| CN | 105137640 A | | 12/2015 | |
| CN | 105158959 A | | 12/2015 | |
| WO | WO-2014/169119 A1 | | 10/2014 | |

OTHER PUBLICATIONS

Alzoubi et al., "Bending Fatigue Study of Sputtered ITO on Flexible Substrate," Journal of Display Technology, Nov. 2011, vol. 7, No. 11, pp. 593-600.
Bai et al., "Transparent hydrogel with enhanced water retention capacity by introducing highly hydratable salt," Applied Physics Letters, published online Oct. 14, 2014, vol. 105, 151903. 5 pages.
Bard et al., "Electrochemical Methods: Fundamentals and Applications," Second Edition, John Wiley & Sons, New York, Dec. 18, 2000. 850 pages.
Blake et al., "Graphene-Based Liquid Crystal Device," Nano Letters, published online Apr. 30, 2008, vol. 8, No. 6, pp. 1704-1708.
Borshch et al., "Nanosecond Electro-Optic Switching of a Liquid Crystal," Physical Review Letters, Sep. 6, 2013, vol. 111, 107802. 5 pages.
Chen et al., "A Three-Dimensionally Interconnected Carbon Nanotube-Conducting Polymer Hydrogel Network for High-performance Flexible Battery Electrodes," Advanced Energy Materials, published online Apr. 22, 2014, vol. 4, 1400207. 10 pages.
Chen et al., "Flexible and stretchable electrodes for next generation polymer electronics: a review," Science China Chemistry, Jun. 2016, vol. 59, No. 6, pp. 659-671.
Chen et al., "Highly Stretchable and Transparent Ionogels as Nonvolatile Conductors for Dielectric Elastomer Transducers," ACS Applied Materials & Interfaces, Apr. 23, 2014, vol. 6, pp. 7840-7845.
Chen et al., "Stretchable and transparent hydrogels as soft conductors for dielectric elastomer actuators," Journal of Polymer Science, Part B: Polymer Physics, published online Jun. 16, 2014, vol. 52, pp. 1055-1060.
Cheng et al., "Using metal/organic junction engineering to prepare an efficient organic base-modulation triode and its inverter," Organic Electronics, available online Sep. 3, 2009, vol. 10, pp. 1636-1640.

Denisin et al., "Tuning the Range of Polyacrylamide Gel Stiffness for Mechanobiology Applications," ACS Applied Materials & Interfaces, Jan. 27, 2016, vol. 8, pp. 21893-21902.
Doherty et al., "The spatial uniformity and electromechanical stability of transparent, conductive films of single walled nanotubes," Carbon, Aug. 2009, vol. 47, Accepted Manuscript, 22 pages.
Eda et al., "Blue Photoluminescence from Chemically Derived Graphene Oxide," Advanced Materials, Jan. 26, 2010, vol. 22, pp. 505-509.
Eda et al., "Chemically Derived Graphene Oxide: Towards Large-Area Thin-Film Electronics and Optoelectronics," Advanced Materials, Jun. 11, 2010, vol. 22, pp. 2392-2415.
Gong et al., "Double-Network Hydrogels with Extremely High Mechanical Strength," Advanced Materials, Jul. 17, 2003, vol. 15, No. 14, pp. 1155-1158.
Guo et al., "Highly Stretchable, Strain Sensing Hydrogel Optical Fibers," Advanced Materials, published online Oct. 7, 2016, vol. 28, pp. 10244-10249.
Hammock et al., "25th Anniversary Article: The Evolution of Electronic Skin (E-Skin): A Brief History, Design Considerations, and Recent Progress," Advanced Materials, Oct. 22, 2013, vol. 25, pp. 5997-6037.
Huang et al., "Efficient flexible polymer light emitting diodes with conducting polymer anodes," Journal of Materials Chemistry, published online Jun. 26, 2007, vol. 17, pp. 3551-3554.
Huang et al., "Patterning of organic devices by interlayer lithography," Journal of Materials Chemistry, published online Jan. 3, 2007, vol. 17, pp. 1043-1049.
International Search Report and Written Opinion dated May 31, 2018, in the International Application No. PCT/US18/21302. 13 pages.
Keplinger et al., "Stretchable, Transparent, Ionic Conductors," Science, Aug. 30, 2013, vol. 341, pp. 984-987.
Khaligh et al., "Silver nanowire transparent electrodes for liquid crystal-based smart windows," Solar Energy Materials & Solar Cells, Jan. 2015, vol. 132, pp. 337-341.
Kim et al., "Highly stretchable, transparent ionic touch panel," Science, Aug. 12, 2016, vol. 353, pp. 682-687.
Kim et al., "Large-scale pattern growth of graphene films for stretchable transparent electrodes," Nature, Feb. 5, 2009, vol. 457, pp. 706-710.
Kim et al., "Spin- and Spray-Deposited Single-Walled Carbon-Nanotube Electrodes for Organic Solar Cells," Advanced Functional Materials, Jun. 23, 2010, vol. 20, pp. 2310-2316.
Kleman et al., Soft Matter Physics: An Introduction, Springer, New York, NY, 2003 edition, Oct. 1, 2002. 664 pages.
Krebs et al., "Upscaling of polymer solar cell fabrication using full roll-to-roll processing," Nanoscale, available online May 4, 2010, vol. 2, pp. 873-886.
Lacour et al., "Stretchable gold conductors on elastomeric substrates," Applied Physics Letters, Apr. 14, 2003, vol. 82, No. 15, pp. 2404-2406.
Larson et al., "Highly stretchable electroluminescent skin for optical signaling and tactile sensing," Science, Mar. 4, 2016, vol. 351, pp. 1071-1074.
Le Bideau et al., "Ionogels, ionic liquid based hybrid materials," Chem. Soc. Rev. Feb. 2011, vol. 40, 907-925.
Lee et al., ""Cut and Stick" Rubbery Ion Gels as High Capacitance Gate Dielectrics," Advanced Materials Jul. 3, 2012, vol. 24, pp. 4457-4462.
Leem et al., "Rapid Patterning of Single-Wall Carbon Nanotubes by Interlayer Lithography," Small, published online Oct. 18, 2010, vol. 6, No. 22, pp. 2530-2534.
Levermore et al., "High efficiency organic light-emitting diodes with PEDOT-based conducting polymer anodes," Journal of Materials Chemistry, Published online Aug. 7, 2008, vol. 18, pp. 4414-4420.
Lewis, "Material challenge for flexible organic devices," Materials Today, Apr. 2006, vol. 9, No. 4, pp. 38-45.
Liang et al., "Elastomeric polymer light-emitting devices and displays," Nature Photonics, Oct. 2013, vol. 7, pp. 817-824.

(56) References Cited

OTHER PUBLICATIONS

Lin et al., "Freezing Molecular Orientation under Stretch for High Mechanical Strength but Anisotropic Hydrogels," Small, Aug. 24, 2016, vol. 12, Issue 32, pp. 4386-4392.
Lipomi et al., "Skin-like pressure and strain sensors based on transparent elastic films of carbon nanotubes," Nature Nanotechnology, Dec. 2011, vol. 6, pp. 788-792.
Lu et al., "Electrically switched color with polymer-stabilized blue-phase liquid crystals," Optics Letters, Feb. 15, 2010, vol. 35, pp. 562-564.
Manandhar et al., "Elastomeric Ionic Hydrogel Sensor for Large Strains," IEEE Sensors Journal, Jun. 6, 2012, vol. 12, No. 6, pp. 2052-2061.
McCoul et al., "Recent Advances in Stretchable and Transparent Electronic Materials," Advanced Electronic Materials, published online Mar. 16, 2016, vol. 2:1500407. 51 pages.
McManamon et al., "Broadband optical phased-array beam steering," Optical Engineering, Dec. 2005, vol. 44(12):128004. 5 pages.
Meyer, "Effects of Electric and magnetic Fields on the Structure of Cholesteric Liquid Crystals," Applied Physics Letters, May 1, 1968, vol. 12, No. 9, pp. 281-282.
Na et al., "Efficient and Flexible ITO-Free Organic Solar Cells Using Highly Conductive Polymer Anodes," Advanced Materials, published online Sep. 29, 2008, vol. 20, pp. 4061-4067.
Niu et al., "Synthesizing a new dielectric elastomer exhibiting large actuation strain and suppressed electromechanical instability without prestretching," Journal of Polymer Science Part B: Polymer Physics, Feb. 1, 2013, vol. 51, issue 3, pp. 197-206.
Oldenbourg, "Polarization Microscopy with the LC-PolScope," Cold Spring Harbor Laboratory Press, Cold Spring Harbor NY, Nov. 2003. 42 pages.
Pishnyak et al., "Electrically tunable lens based on dual-frequency nematic liquid crystal," Applied Optics, Jul. 1, 2006, vol. 45, No. 19, pp. 4576-4582.
Robinson et al., "Integrated soft sensors and elastomeric actuators for tactile machines with kinesthetic sense," Extreme Mechanics Letters, available online Sep. 25, 2015, vol. 5, pp. 47-53.
Shian et al., "Electrically tunable window device," Optics Letters, Mar. 15, 2016, vol. 41, pp. 1289-1292.
Sun et al., "Highly stretchable and tough hydrogels," Nature, Sep. 6, 2012, vol. 489, pp. 133-136.
Sun et al., "Ionic Skin," Advanced Materials, published online Oct. 29, 2014, vol. 26, pp. 7608-7614.
Sato et al., "Variable-Focus Liquid-Crystal Fresnel Lens," Japanese Journal of Applied Physics, Aug. 1985, vol. 24, pp. L626-L628.
Søndergaard et al., "Roll-to-roll fabrication of polymer solar cells," MaterialsToday, Jan.-Feb. 2012, vol. 15, pp. 36-49.
Tang et al., "Fatigue fracture of hydrogels," Extreme Mechanics Letters (2017), available online Oct. 3, 2016, vol. 10, pp. 24-31.
Wang et al., "Extremely Stretchable Electroluminescent Devices with Ionic Conductors," Advanced Materials (2016), published online Dec. 4, 2015, vol. 28, pp. 4490-4496.
Wysocki et al., "Electric-Field-Induced Phase Change in Cholesteric Liquid Crystals," Physical Review Letters, May 6, 1968, vol. 20, No. 19, pp. 1024-1025 and Figure 1. 3 pages.
Wöbkenberg et al., "Reduced Graphene Oxide Electrodes for Large Area Organic Electronics," Advanced Materials, published online Mar. 1, 2011, vol. 23, 1558-1562.
Yamamoto et al., "Development of Ga-doped ZnO transparent electrodes for liquid crystal display panels," Thin Solid Films (2012), available online Apr. 22, 2011, vol. 520, pp. 4131-4138.
Yang et al., "Indium Tin Oxide (ITO) serpentine ribbons on soft substrates stretched beyond 100%," Extreme Mechanics Letters, available online Jan. 25, 2015, vol. 2, pp. 37-45.
Yang et al., "Ionic cable," Extreme Mechanics Letters (2015) available online Mar. 7, 2015, vol. 3, pp. 59-65.
Yang et al., "Electroluminescence of Giant Stretchability," Advanced Materials (Author Proof), Nov. 3, 2015. 4 pages.
Yang et al., "Electroluminescence of Giant Stretchability," Advanced Materials Jun. 8, 2016, vol. 28, issue 22, pp. 4480-4484.
Yao et al., "Nanomaterial-Enabled Stretchable Conductors: Strategies, Materials and Devices," Advanced Materials, Jan. 26, 2015, vol. 27, pp. 1480-1511.
Yodyingyong et al., "ZnO nanoparticles and nanowire array hybrid photoanodes for dye-sensitized solar cells," Applied Physics Letters, published online Feb. 19, 2010, vol. 96:073115. 4 pages.
Yuk et al., "Skin-inspired hydrogel-elastomer hybrids with robust interfaces and functional microstructures," Nature Communications, Jun. 27, 2016, vol. 7:12028. 11 pages.

\* cited by examiner

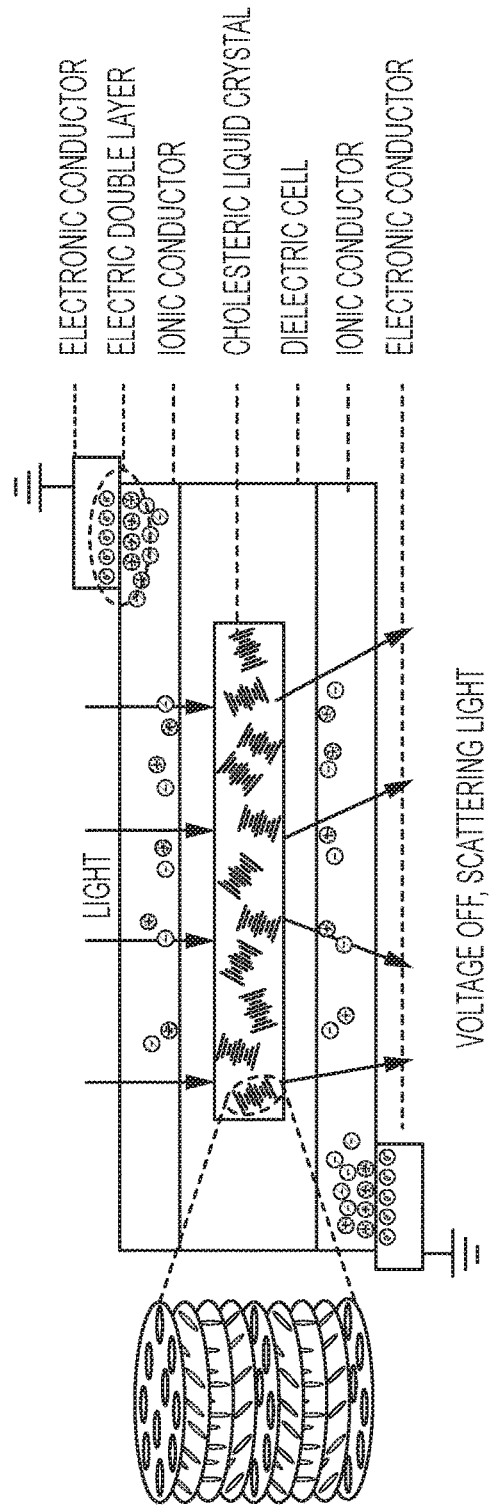
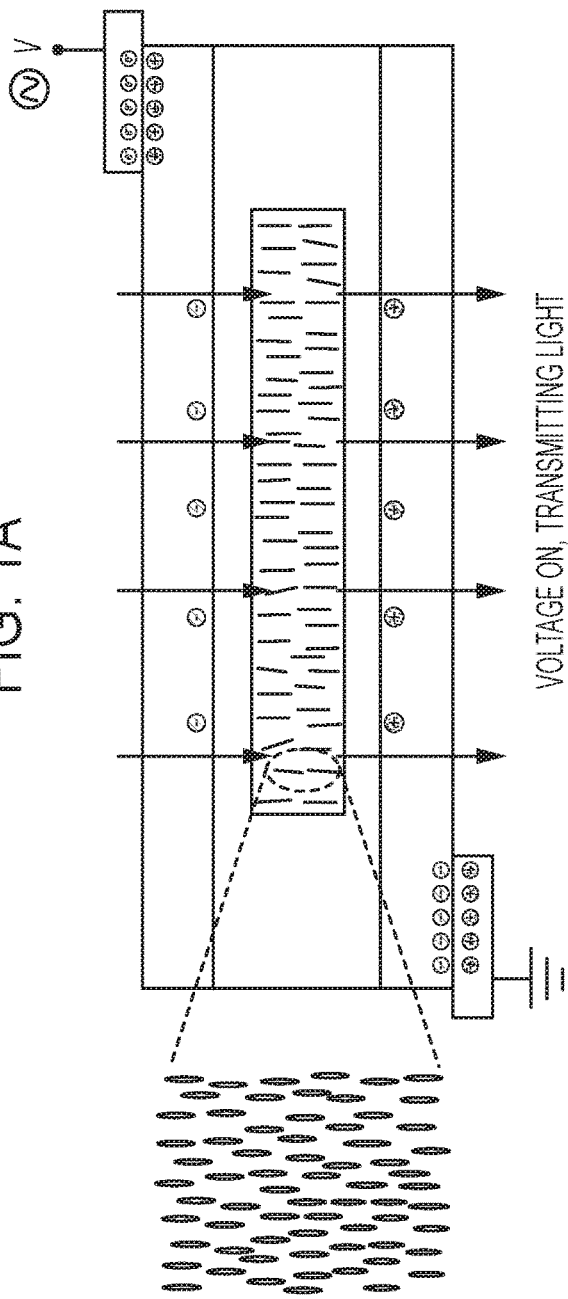
FIG. 1A
FIG. 1B

STRETCHABLE ELECTROOPTICAL AND MECHANOOPTICAL DEVICES COMPRISING A LIQUID CRYSTAL CELL DISPOSED BETWEEN FIRST AND SECOND IONIC CONDUCTING GEL LAYERS

RELATED APPLICATIONS

This application is a National Stage Entry of PCT International Application No. PCT/US2018/021302 filed Mar. 7, 2018, which claims the benefit of priority under 35 U.S.C. § 119(e) to U.S. Application Ser. No. 62/468,073, filed Mar. 7, 2017, the contents of which are incorporated herein by reference in their entirety.

STATEMENT REGARDING FEDERALLY SPONSORED RESEARCH OR DEVELOPMENT

This invention was made with government support under Grant DMR-0820484 awarded by the National Science Foundation. The government has certain rights in the invention.

INCORPORATION BY REFERENCE

All patents, patent applications and publications cited herein are hereby incorporated by reference in their entirety in order to more fully describe the state of the art as known to those skilled therein as of the date of the invention described herein

TECHNICAL FIELD

This invention relates to electrooptical devices. In particular, the invention relates to liquid crystal electrooptical devices that use ionic conductors instead of electronic conductors.

BACKGROUND

Liquid crystals have enabled many electrooptical devices, including liquid-crystal displays, universal optical phase modulators, beam steering devices, tunable Fresnel lenses, broad-spectrum tunable color reflectors, and nanosecond light modulators. These devices require transparent conductors to apply voltage and let light through. The widely used transparent conductor, indium tin oxide (ITO), is a brittle and costly inorganic, and requires vacuum for deposition.

Enormous efforts are devoted to the development of new transparent conductors, usually using soft matrices to host conducting materials, such as conducting polymers, carbon nanotubes, graphene, nanoparticulate metal oxides, and silver nanowires. These conductors, like ITO, carry electricity using electrons. The development of transparent electronic conductors has many challenges. First, conduction electrons reflect or absorb light, so that electronic conductors cannot simultaneously achieve high electrical conductance and high optical transmittance. Second, most electronic conductors are hard inorganic materials, prone to fracture and delamination under monotonic and cyclic stretch. Patterning or pre-straining can make composite electrodes stretchable, but constituent materials remain mechanically mismatched. Third, devices requiring materials of very different processing conditions restrict roll-to-roll fabrication and digital manufacturing.

These disadvantages make electronic conductors an awkward choice in applications that requires strong bending or stretching, as well as high optical transparency, such as flexible displays and wearable electronics.

Unlike electronic conductors, ionic conductors are readily being highly stretchable and transparent. Recent works have demonstrated that ionic conductors can enable devices of unusual characteristics. Devices of high voltage (10 kV), and high frequency (up to 100 MHz) have been demonstrated, as well as artificial muscle, axon, and skin. Potential applications include transparent loudspeakers and active noise cancellation, strain and pressure sensors, and stretchable touch pads. The soft devices can be made attachable to living tissues and soft robots. Ionic conductors have also enabled ionotronic devices, which integrate ionic conductors and electronic conductors. Examples include the rocking-chair operation of light-emitting diodes, and stretchable electroluminescence.

SUMMARY

A stretchable electrooptical and/or mechanooptical device having good electrical and mechanical switching properties is described. In one or more embodiments, the device uses ionic conductors to replace some or all of the electronic conductors to operate. In one or more embodiments, polymer gels are employed as transparent ionic conductors in devices to realize fully organic liquid-crystal devices (OLCDs). Ionic conductors, in principle, can be used to drive liquid crystal devices of all kinds. The use of ionic conductors greatly expands the choice of transparent conductors in liquid crystal devices, endows the devices with new attributes such as softness and enables possible potential applications for flexible and stretchable displays.

In one aspect, a stretchable electrooptical device, includes a liquid crystal cell disposed between first and second ionic conducting gel layers; and first and second electronic conductors in electrical contact with the first and second ionic conducting gel layers, respectively, said first and second electronic conductors connectable to an external voltage source.

In one or more embodiments, the liquid crystal cell includes a liquid crystal enclosed in a dielectric layer.

In one or more embodiments, the dielectric layer includes an elastomer, and for example, the ionic conducting gel layer includes an elastomeric hydrogel.

In any preceding embodiments, the hydrogel fluid includes an electrolyte.

In any preceding embodiments, the ionic conducting gel layer includes an ionomer.

In any preceding embodiments, the liquid crystal cell includes a liquid crystal layer that is immiscible with the ionic conducting gel layer.

In any preceding embodiments, the liquid crystal cell defines an active region of the device.

In any preceding embodiments, the liquid crystal is in contact with the ionic conductors outside the area of the liquid crystal active region.

In any preceding embodiments, the liquid crystal cell is prestretched in a resting state.

In any preceding embodiments, the liquid crystal region is biaxially stretched in the resting state.

In any preceding embodiments, the device is selected from the group of liquid crystal displays (LCDs), universal optical phase modulator, beam steering device, tunable Fresnel lens, broad-spectrum tunable color reflector and nanosecond light modulator.

In another aspect, a method of switching an electrooptical device includes providing a stretchable electrooptical device according to any one of the embodiments described herein, wherein the liquid crystal defines an active region; and applying a voltage to the display, wherein the active region switches from a first resting state to a second activated state.

In any preceding embodiments, the first resting state is opaque and the second activated state is transparent.

In any preceding embodiments, the method further includes applying a mechanical strain λ to the device, wherein λ is defined as the diameter of the device in a stretched state divided by that in a reference state, and for example, λ is in the range of 1 to 2.

In any preceding embodiments, the stretching includes biaxially stretching the device.

In any preceding embodiments, the applied voltage needed to switch the active region is reduced by prestretching the device.

In any preceding embodiments, transparency increases while the threshold voltage for switching decreases as λ increases.

In another aspect, a method of switching an electrooptical device includes providing a stretchable electrooptical device according to any one of the embodiments described herein, wherein the liquid crystal defines an active region; and applying a constant voltage to the device, wherein the voltage is below the threshold voltage sufficient to switch the active region from opaque to transparent; and applying a mechanical strain, λ, wherein the active region switches from opaque to transparent.

Conventional liquid-crystal devices are stiff and brittle, struggling to satisfy the fast-growing demands for mobile and wearable applications. The organic liquid-crystal devices (OLCDs) described herein demonstrate electrooptical characteristics on par with conventional liquid crystal devices that use electronic conductors. The OLCDs perform electrooptical functions without electrochemical reactions. Furthermore, the polymer gels are stretchable, so that the OLCDs are optically responsive to both mechanical force and electrical voltage; they are mechanooptical and electrooptical devices. The softness of the devices may bring liquid crystals to new domains of applications, such as wearable displays for camouflage and entertainment. One can also imagine programmable, high-resolution, tissue-attachable patterns of light for optogenetics and optoceuticals—that is, a direct TV for the brain, heart, and skin.

BRIEF DESCRIPTION OF THE DRAWING

The invention is described with reference to the following figures, which are presented for the purpose of illustration only and are not intended to be limiting.

In the Drawings:

FIG. 1A is a schematic illustration of an organic liquid-crystal device in the opaque state with the external voltage OFF; FIG. 1B is a schematic illustration of an organic liquid-crystal device in the transparent state with the external voltage ON.

DETAILED DESCRIPTION

In one aspect, electrooptical devices that overcome the drawbacks of conventional liquid crystal based electrooptical devices are provided. Liquid crystal based electrooptical devices are mostly voltage driven. Thus, the current-carrying ability of the device is not a critical factor in device operation and the current-carrying ability of conventional electronic conductors is not a critical feature of the devices.

Fully organic liquid-crystal devices (OLCDs) are described. In one or more embodiments, ionic conductors, such as hydrogels and ionogels, are used to apply voltage in electrooptical devices. A liquid crystal is encapsulated in a dielectric elastomer cell, and then sandwiched between ionic conducting gels. A voltage applied to the device through the ionic conducting gel drives the device. The OLCDs achieve the same electrooptical characteristics as the liquid-crystal devices using electronic conductors. The OLCDs maintain electrooptical performance under biaxial stretch. OLCDs are amenable to roll-to-roll and digital manufacturing. Because many of the ionic conductors described herein are stretchable and deformable, mechanooptical devices are also contemplated.

Figure 1C:
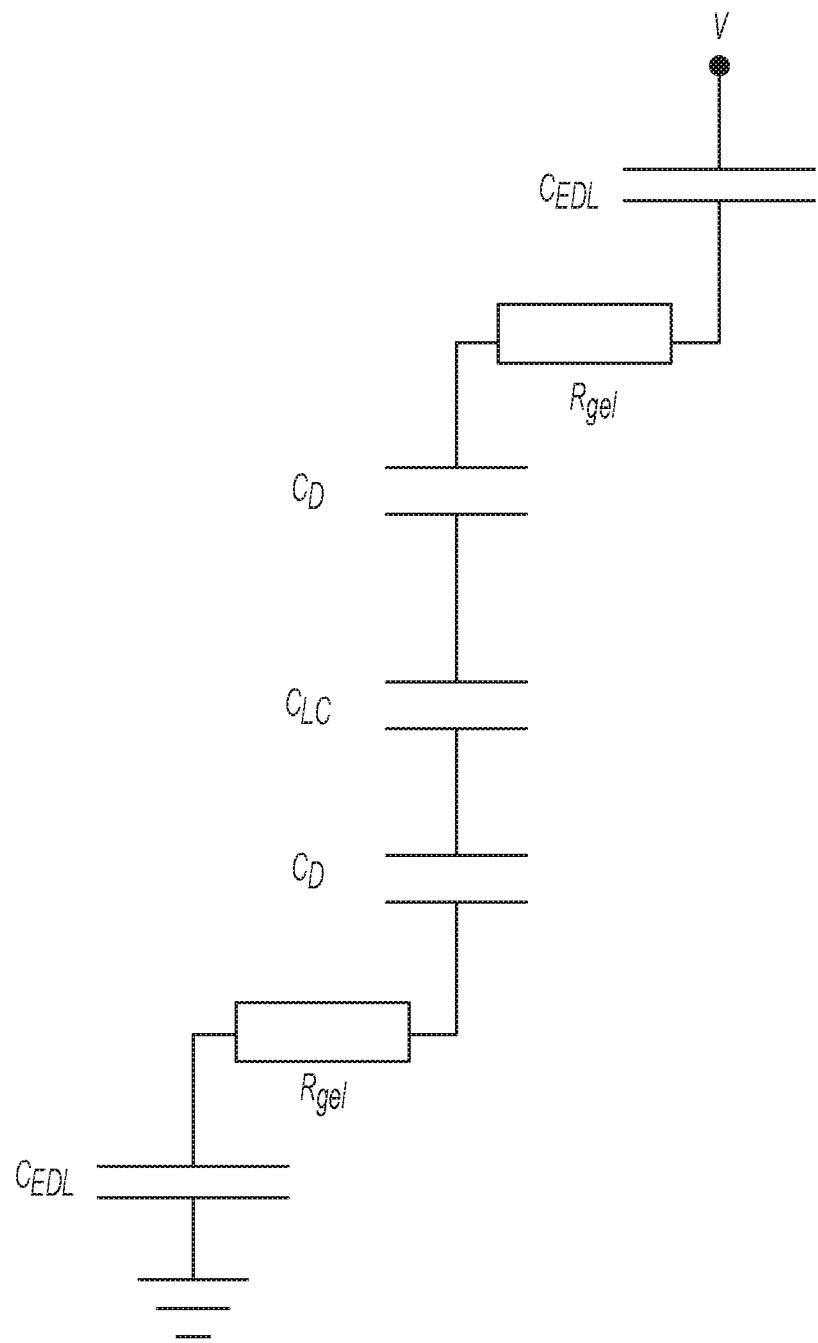
FIG. 1C is the equivalent circuit of the device.

Principle and equivalent electrical circuits of a stretchable electro-optical device are shown in FIGS. 1A-1C. However, the principle applies to all liquid-crystal devices such as liquid crystal displays (LCDs), universal optical phase modulator, beam steering device, tunable Fresnel lens, broad-spectrum tunable color reflector and nanosecond light modulators. A voltage-driven light shutter is described, but other LC devices are within the scope of the invention. In FIGS. 1A and 1B, a cholesteric liquid crystal is encapsulated in a dielectric cell, and the dielectric cell is sandwiched between ionic conductors. The ionic conductors are connected using electronic conductors to an external voltage source. The dielectric layer serves to prevent the mixing of the ionic conductors and the liquid crystal. It also helps prevent electrical breakdown. If the surfaces of the dielectric cell are not treated with mechanical rubbing or alignment agents, the liquid-crystal molecules orient randomly on the dielectric surfaces. When the external voltage is off, the liquid crystal molecules are unaligned, e.g., form focal conic texture (twist domains with randomly orientated helical axis), the domain boundaries scatter light, and the device is opaque, as is shown in FIG. 1A. When the external voltage is on, the electric field unwinds the twisted domains, the liquid-crystal molecules align with the electric field, and the device is clear, as is shown in FIG. 1B. In operation, the applied voltage desirably is high enough to align the liquid crystal molecules, but low enough to avoid electrical breakdown in the cholesteric and the dielectric, and avoid electrolysis of the gel.

Each interface between an ionic conductor and an electronic conductor forms an electric double layer (EDL). The voltage drop over each EDL is much lower than 1 V, so that the EDL remains stable, and behaves like a capacitor, $C_{EDL}$, in series with the capacitors due to the dielectric elastomers and the liquid crystals, $C_D$ and $C_{LC}$, as well as the resistors due to the ionic conductors, $R_{gel}$. The equivalent circuit for the device is shown in FIG. 1C.

In other embodiments, the device can be switched by applying a voltage above a threshold voltage. When a voltage is applied, charges accumulate at the electrical double layers. The accumulated charges produce an electric field across the liquid crystals. The cholesteric liquid crystals untwist, align along the electric field, eliminate the domain boundaries, and transmit light. The threshold voltage is the voltage sufficient to unwind the twisted domains, so that the liquid-crystal molecules align with the electric field. In one or more embodiments, hydrogels or ionogels doped with ions are used as stretchable transparent electrodes in an OLCD to apply voltage to the device. Cholesteric liquid crystals (CLCs) are used as functional materials to function, for example, as a light shutter. Without applied voltage, it scatters light, resulting in a low transmittance of normal incident light, but with applied voltage, it transmits light and the device becomes transparent with a high transmittance. The response time of the device follows a typical LCD fashion: namely, the turn-on time $\tau_{on}$ decreases drastically as the applied voltage increases, while the turn-off time $\tau_{off}$ is independent of applied voltage. The device is stretchable to up to 125% area strain, while remaining switchable. The driving voltage needed and response time both decrease as the area strain increases.

In other embodiments, the device can be switched using a combination of voltage and mechanical (stretching) force λ. λ is defined as the diameter of the device in a stretched state divided by that in a reference state. In one or more embodiments, the same applied voltage can switch the device as a faster rate when the device is stretched. In one or more embodiments, the maximum transmittance increases while the threshold voltage for switching decreases as A increases.

The ionic conductors are made of gels; they are transparent and stretchable. Many polymer gels can be used as stretchable, transparent, ionic conductors.

A hydrogel, one example of a polymer gel, is a polymer network swollen with water that can dissolve ions of multiple moles per liter, leading to relatively low resistivity $\sim 10^{-1}$ Ωm. Even through this resistivity is much higher than that of ITO ($\sim 10^{-5}$ Ωm), a millimeter-thick hydrogel can achieve a surface resistance of 100Ω. At the same time, the optical transparency for a millimeter-thick hydrogel can be as high as 99.9%. The softness of the gels allows large, elastic deformation over many cycles. For example, a polymer network can provide tunable elastic modulus of 0.1 kPa-10 MPa, depending on the choice of polymer, cross-linker density and water concentration. Hydrogels as tough as natural rubber have been demonstrated. In addition, hydrogels can retain water in low-humidity environment if they contain humectants, or are encapsulated in low-permeability elastomers.

The chemical properties of hydrogels are typically determined by the polymer backbone, any functional side chains on the monomer units and the crosslinking agent. The physical properties, for example, mechanical strength and swelling ratio, are controlled typically by the crosslink density. Thus, hydrogels of extremely high transparency and suitable mechanical strength can be used. In exemplary embodiments, polyacrylic acid, poly N-isopropylacrylamide (PNIPA), poly hydroxy ethyl methacrylate (PHEMA), polyethylene glycol (PEG), polyvinylalcohol (PVA), and/or acrylamide can be used as the base material for the hydrogel. Highly stretchable and tough hydrogels made from ionically crosslinked alginate, and covalently crosslinked polyacrylamide can also be used. In other instances, transparent, elastomeric and tough hydrogels from poly(ethylene glycol) can be made from PEG that has been covalently cross-linked through photopolymerization. A hydrogel containing sliding-ring polymers, e.g., polymer networks threading polymer chains through polycyclic linkers, can be stretched to more than 10 times its initial length; a tetra-poly(ethylene glycol) gel has a strength of ~2.6 MPa. These gels deform elastically. A gel can be made tough and notch-insensitive by introducing energy-dissipating mechanisms. For example, a fracture energy of ~10,000 J m$^{-2}$ is achieved with a double-network gel, in which one network is physically cross-linked via electrostatic interactions and the other network is chemically cross-linked via covalent bonds respectively. Further details on the preparation of elastomeric hydrogels can be found in "Highly stretchable and tough hydrogels" Sun et al. Nature (489) 133 (Sep. 6, 2012), which is incorporated by reference. In one or more embodiments, hydrogel layers with a thickness in the range of 5 μm-1000 μm can be employed.

As another example, an ionogel is a polymer network swollen with an ionic liquid. Ionogels are nonvolatile even in vacuum, and can access a wide range of temperature through suitable choices of ionic liquid. Ionogels demonstrate widely tunable mechanical, chemical, optical and electronic properties through a large variety of ionic liquid candidates.

The liquid crystal can be any of those materials commonly used in the display field. By way of example, the liquid crystal can be nematic liquid crystals, smectics liquid crystals, chiral liquid crystals, blue phase liquid crystals, polymer dispersed liquid crystals (PDLCs) or polymer stabilized liquid crystals (PSLCs).

The dielectric layers serve two functions. First, the dielectric layers prevent the mixing of the gel and the liquid crystal. Second, the dielectric layers prevent electrical breakdown even if the Maxwell stress causes the top and bottom surfaces to deflect into contact. In one or more embodiments, the voltage for switching can be reduced by reducing the thickness of the dielectric and liquid crystal layers. In certain embodiments, the device does not include a dielectric layer and the liquid crystal is in direct contact with the ionic gel layers. This arrangement may be suitable for example when the gels and the liquid crystal are immiscible. The Maxwell stress will deflect the gels negligibly if the device is sandwiched between elastomers of suitable stiffness.

Any material having a sufficiently high dielectric strength to prevent electric breakdown of the device when the liquid crystal molecules align may be used as the dielectric layer. In one or more embodiments, the dielectric layer is an insulator. The dielectric cell is preferably made of an elastomer so that the device is stretchable and deformable. Exemplary elastomers include a silicone rubber, an acrylonitrile-butadiene rubber (NBR), a hydrogenated acrylonitrile-butadiene rubber (H-NBR), an ethylene-propylene-diene rubber (EPDM), an acrylic rubber, a urethane rubber, an epichlorohydrin rubber, a chlorosulfonated polyethylene, and a chlorinated polyethylene. Common materials used in the actuator applications are VHB 4910 and VHB 4905 (3M). Exemplary transparent dielectrics include PDMS, also acrylic rubbers. Additional suitable dielectric elastomers are described in Journal of Polymer Science, Part B: Polymer Physics, 2013, 51, 197-206, which is incorporated in its entirety by reference. Suitable thickness can depend on the intended application. In a general circuit, there are no special requirements for the thickness. The higher the thickness, the lower the capacity, and the higher the required applied voltage. In the actuator application, typical thicknesses range from 10 μm to 1 mm.

The electronic conductors can be any electronic conductor. Exemplary electrodes include gold, platinum, silver, or any other metal. Also, possible electronic conductors are based on carbon, such as carbon grease, carbon particle impregnated elastomers, carbon fibers, carbon nanotube, graphene etc. The electronic conductor can be used in a variety of form factors, such as in the form of thin films, sheets, fabrics, meshes and the like. The electronic conductors can be opaque and rigid metal foils, as they contact the ionic conductors outside the area of the liquid crystals, and do not affect transmittance and stretchability of the device. Exemplary electronic conductors can be electrochemically inert in the presence of the electrolyte used in the ionic conductor. In some embodiments, the electronic conductor can be stretchable, flexible, elastic, and/or transparent. However, since the conductor can be small, it is not required to be stretchable, flexible, or transparent. The electrode can be non-elastic and/or non-transparent without affecting the overall stretchability and transparency of the device. In one or more embodiments, the electronic conductor can be multilayered and can include an outer protective layer. There are no limitations with respect to thickness and other geometric parameters of the electronically conducting electrode. The overlapping area between electronic conductor and ionic conductor, i.e., the EDL area, will not affect the switching performance. If the adhesion between the electronic conductor and the ionic conductors is good enough, the electronic conductor can be any shape.

Liquid-crystal devices (OLCDs) using ionic electrodes is described. Liquid crystals are anisotropic dielectrics. Their electrooptical effects require application of voltage, not injection of electrons. Consequently, ionic conductors can be used to drive liquid crystal devices of all kinds. The basic structure of the devices is compatible with surface patterning, distribution of particles, polymer-dispersed liquid crystals, and polymer-stabilized liquid crystals. Whereas only a single-pixel cell is described, the configuration of the device is generic. Ionic conductors, in principle, can also drive arrays of pixels and multilayer devices. OLCDs are fully organic, amenable to roll-to-roll and digital manufacturing.

The use of ionic conductors greatly expands the choice of transparent conductors. This large pool of materials will enable liquid-crystal devices of new characteristics. For example, one may choose a gel, an elastomer, and a liquid crystal to match their refractive indices, and thereby minimize the Fresnel reflections. By contrast, conventional liquid-crystal devices have mismatched reflective indices (~2.0 for ITO, and ~1.5 for glass).

The new attribute of OLCDs—the softness—may bring liquid crystals to new domains of applications, such as wearable displays for camouflage, and curved, deformable displays for entertainment. One can also imagine programmable, high-resolution, tissue-attachable patterns of light for optogenetics and optoceuticals—that is, a direct TV for the brain, heart, and skin.

Figure 2A:
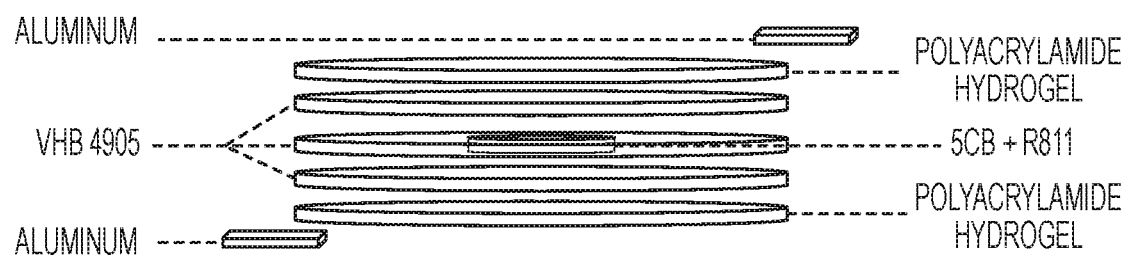
FIG. 2A is a schematic showing an expanded view of a liquid-crystal device showing the assembly of the individual elements.

The synthesis and testing of an exemplary OLCD device is described. Three layers of an acrylic elastomer (VHB 4905, 3M) were used to make the dielectric cell, two layers of a polyacrylamide hydrogel containing 8.0 M lithium chloride as the ionic conductors, and two pieces of aluminum as the electronic conductors. An exploded view of each of the layers making up the device is shown in FIG. 2A.

Synthesis of the Ionic Conductor:

The ionic conductor was a polyacrylamide hydrogel containing lithium chloride. To prepare the ionic conductor, 2.4888 g of acrylamide and 5.94 g of lithium chloride were dissolved in 17.5112 g of deionized water. The resulting concentration of lithium chloride was 8.0 M. To the solution 0.0015 g of crosslinker (N,N'-methylenebisacrylamide, MBAA) was added 8 μL of accelerator (N,N,N',N'-tetramethylethylenediamine, TEMED), and 0.0025 g of initiator (ammonium persulphate, APS). After careful stirring, the solution was transferred into a glass mold with a 1 mm thick spacer, and then placed in a fume hood to cure at room temperature for 6 hours. The as-prepared ionic conductor was removed from the mold, cut into pre-designed shape and then transferred onto the target device.

Preparation of the Cholesteric Liquid Crystal:

The cholesteric liquid crystal was made by mixing a nematic (5CB, 95.0 wt %) and a chiral dopant (R-811, 5.0 wt %) having the structures shown.

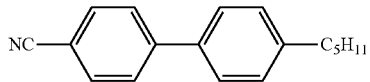

5CB

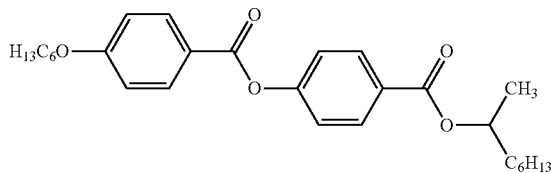
R-811

The cholesteric liquid crystal contained a nematic liquid crystal (4-Cyano-4'-pentylbiphenyl, 5CB) and a chiral liquid crystal (4-(hexyloxy)-, 4-[[[(1r)-1-methylheptyl]oxy]carbonyl], R-811) at a weight ratio of 95:5. The solution was homogenized using a vortex mixer (Digital Vortex Mixer, VWR) for 10 min.

Fabrication of Electrooptical Devices.

Referring to FIG. 2A, a layer of dielectric elastomer (VHB 4905, 3M) was cut into a disk with a hole at the center using a laser cutter (UNIVERSAL), followed by laminating onto another layer of VHB 4905. The two layers were fastened on a biaxial stretcher, pre-stretched and mounted on a rigid circular-ring frame. The cholesteric liquid crystal was added into the hole. Another layer of VHB 4905 with the same pre-stretch was laminated to seal the liquid crystal, forming a liquid-crystal cell. The polyacrylamide hydrogel was cut into circular shape with a tail for electrical connection, and then laminated on the two sides of the liquid-crystal cell. Two aluminum foils were placed on the hydrogels outside the active area to connect the device to the voltage source. Based on this method of assembly, the cholesteric has the same thickness as the middle layer of the dielectric cell.

Electrooptical Measurements:

The optical transmittance and switching behavior of the device was measured. A signal generator (KEYSIGHT, 33500B) was used to supply square-wave signal at 1 kHz. The signal from the generator was fed through an amplifier (TRek, MODEL 30/20A) with a magnifying factor of 3000 to the two aluminum foils on the electrooptical device. The resulting voltage waveform had minimum and maximum amplitude of $-V_0$ and $+V_0$, respectively, where $V_0$ was the set voltage. Optical transmittance was measured by placing the device between two collimating lenses, connected using optical fibers to a tungsten light source and a spectrometer (Ocean Optics, USB 2000+). Before the measurement, a voltage was applied for 5 s and removed to obtain an initial opaque state. Data were collected with a custom-made LabVIEW program.

Figure 2B:
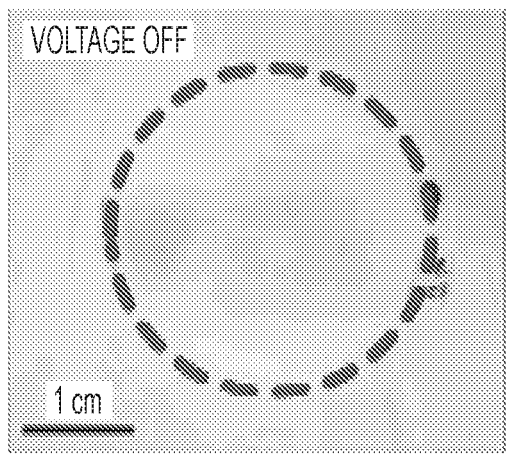
FIGS. 2B and 2C are images of the device demonstrating that when voltage is off, the device is opaque, and when voltage is on, the device is transparent. The dashed circles indicate the areas containing the liquid crystal.
Figure 2C:
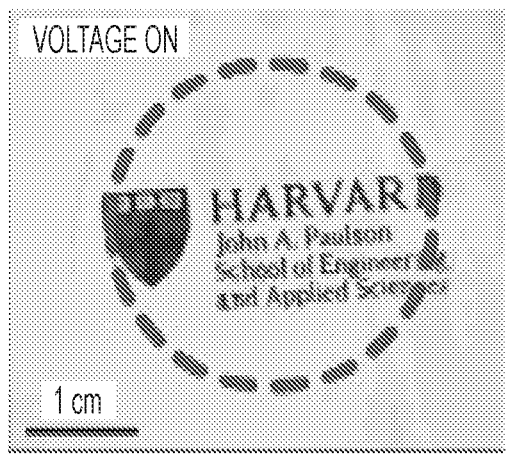

A square-wave voltage was applied at amplitude 600 V and frequency 1 kHz. When voltage was off, the area covered by the cholesteric was opaque, and the area covered by the hydrogel and elastomer was transparent, as shown in FIG. 2B. When voltage was on, the cholesteric became transparent, as shown in FIG. 2C. The dashed line indicates the location of the OLCD device. During testing, alternating voltage was applied to prevent space charges from accumulating at the interfaces between the cholesteric and the dielectric. Such space charges would build an internal electric field to counteract the applied electric field.

Figure 2D:
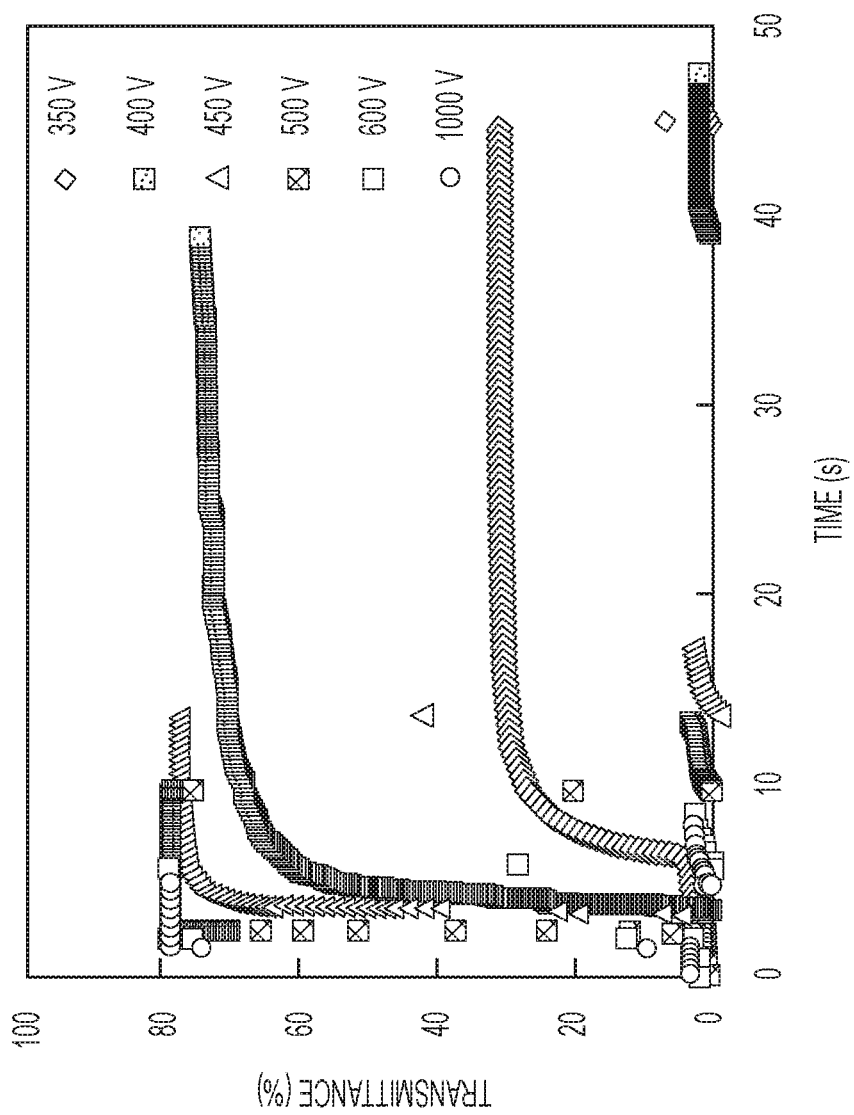
FIG. 2D is a plot of % transmittance vs. time showing the transmittance of the device as a function of time under square-wave voltage of various amplitudes at a frequency of 1 kHz.
Figure 2E:
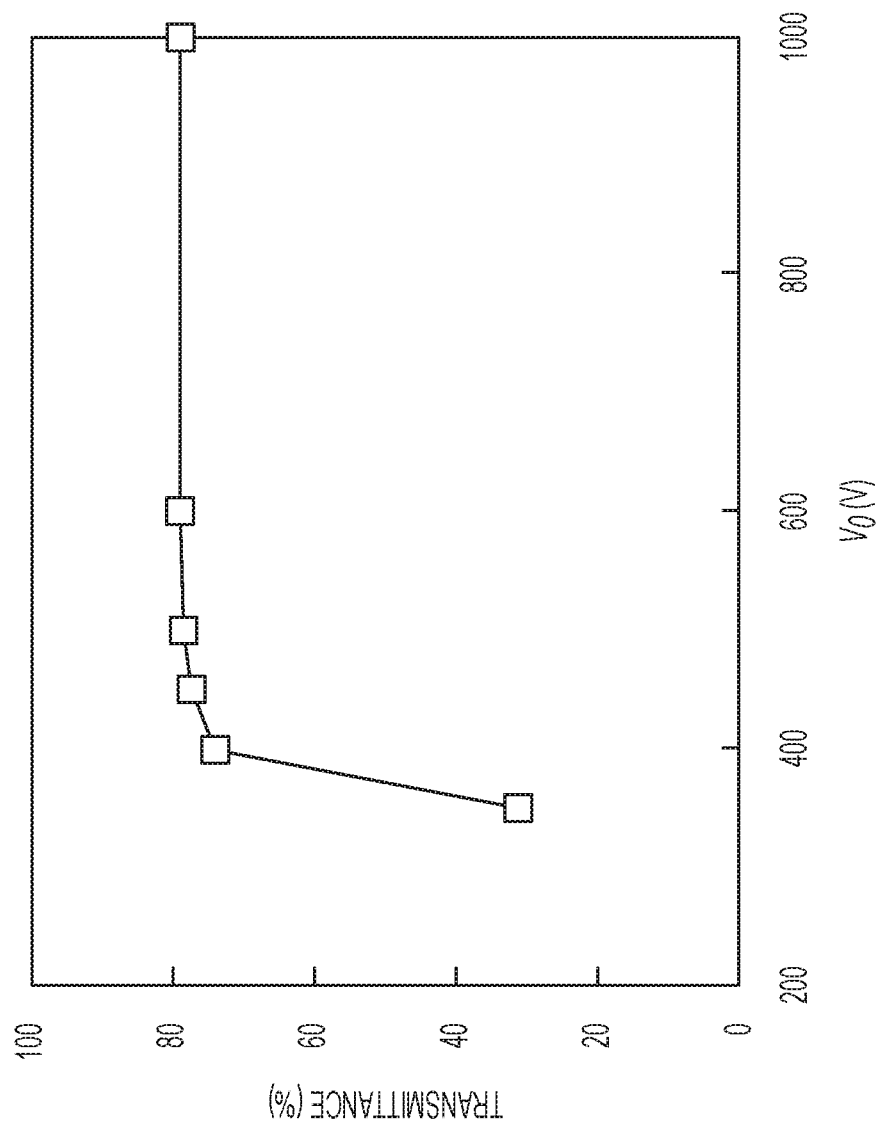
FIG. 2E is a plot of % transmittance vs. voltage showing how the transmittance of the device increases and then saturates as voltage increases.
Figure 2F:
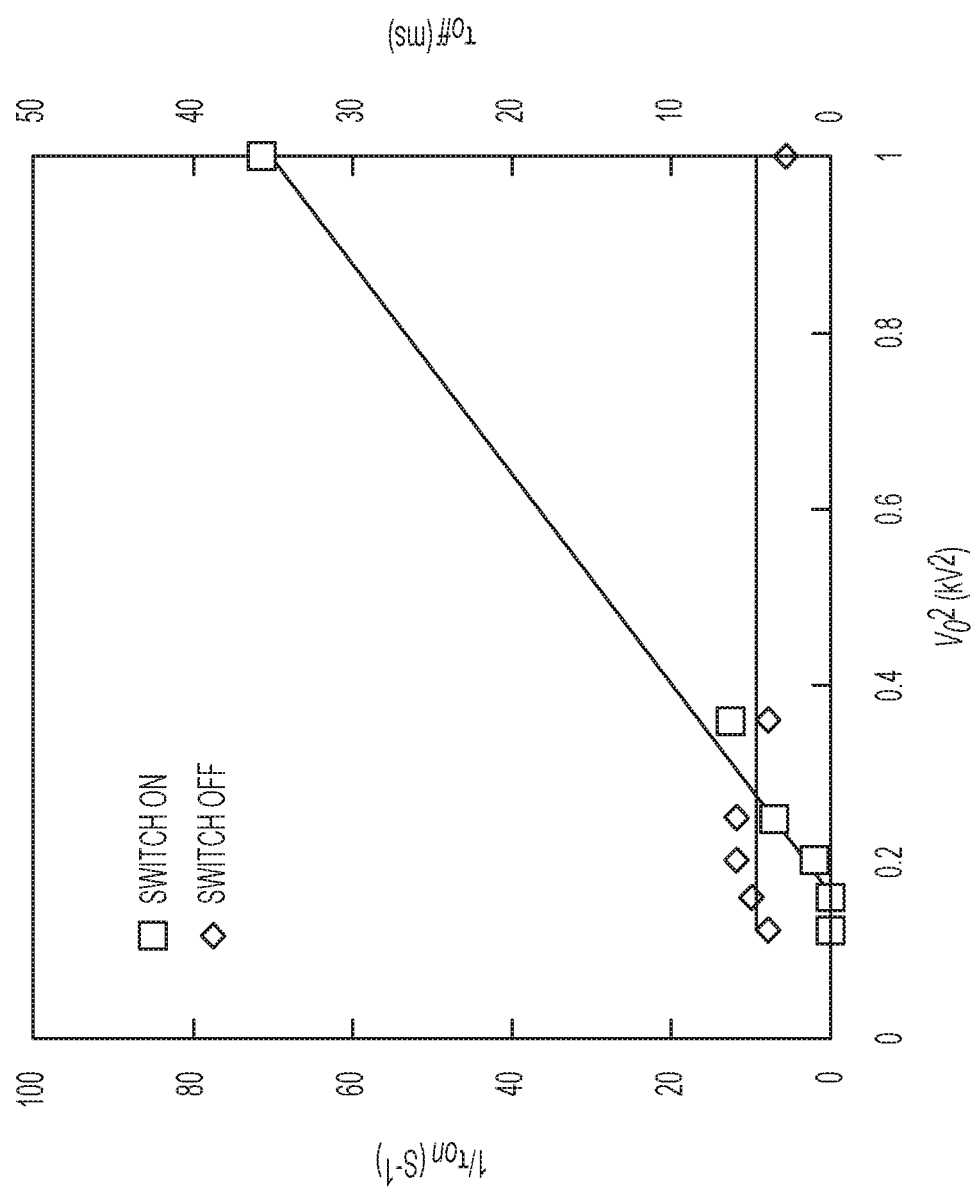
FIG. 2F is a plot demonstrating that the reciprocal of switch-on time, $1/\tau_{on}$, increases linearly with the voltage square, while the switch-off time, $\tau_{off}$, is almost constant. The solid lines are linear-fitting curves.
Figure 5:
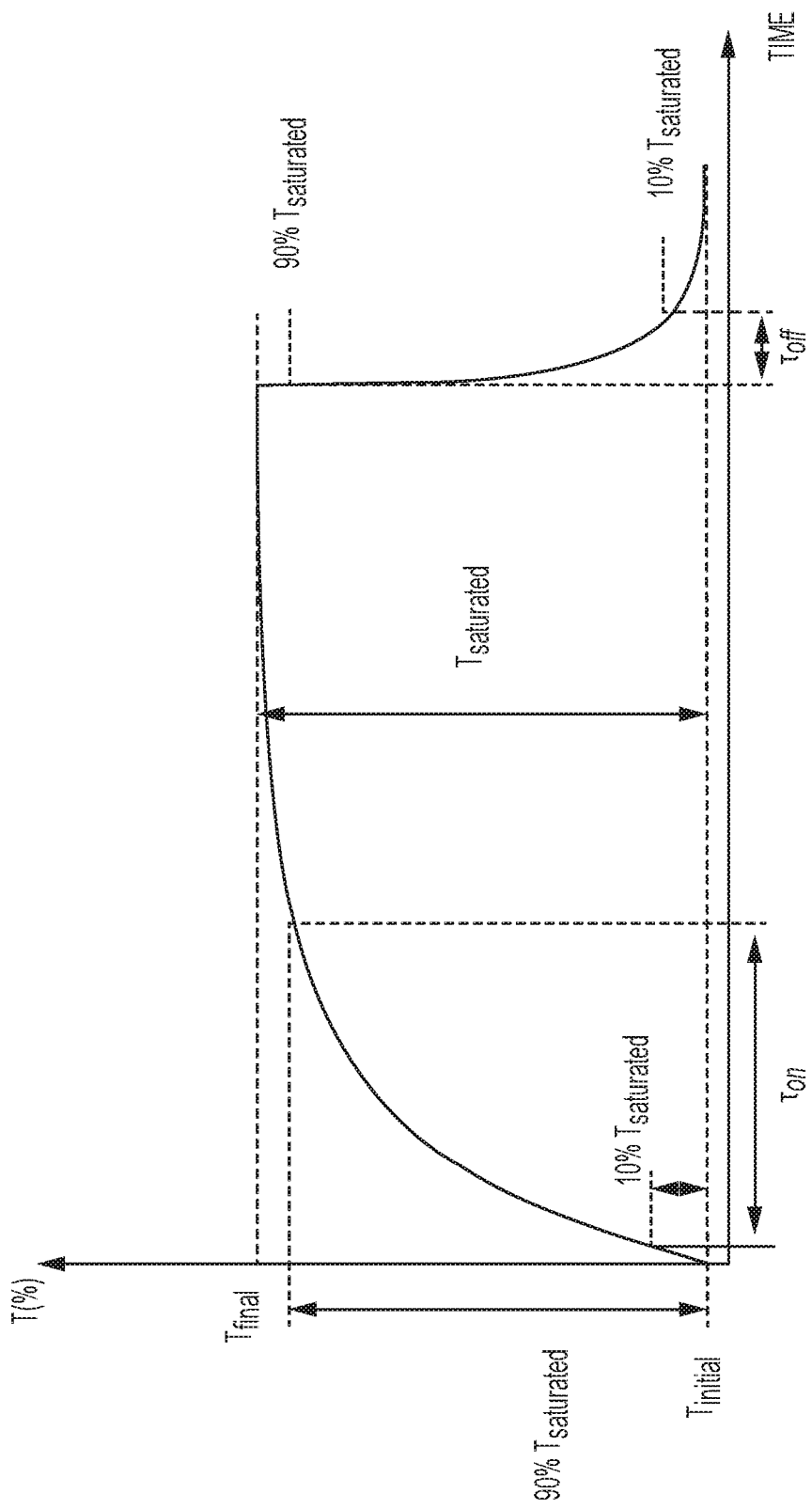
FIG. 5 is a schematic showing determination of switch on time and switch off time.

After the voltage was switched on, the transmittance of the device increased with time and then saturated, as is shown in FIG. 2D. The saturated transmittance increased as the voltage increased, and plateaued at higher voltages. For this particular device, transmission plateaued at about 80% transmission at about 500 V, as shown in FIG. 2E. The switch-on time $\tau_{on}$ and switch-off time $\tau_{off}$ also were measured. $T_{saturated}$ is defined as the difference between the initial transmittance $T_{initial}$ and the final transmittance $T_{final}$. The switch-on time $\tau_{on}$ is defined as the time needed for the transmittance to increase from 10% $T_{saturated}$ to 90% $T_{saturated}$. The switching-off time $\tau_{off}$ is defined as the time needed for the transmittance to reduce from 90% $T_{saturated}$ to 10% $T_{saturated}$. This is shown schematically in FIG. 5. As shown in FIG. 2F, the inverse of the measured switch-on time is proportional to the square of voltage, $$\frac{1}{\tau_{on}} \propto V_0^2,$$

and the switch-off time is nearly independent of voltage.

The observed electrooptical characteristics can be related to fundamental principles. The applied voltage should be low enough to avert electrical breakdown in the cholesteric and the dielectric, and avert electrolysis of the gel. The voltage drop on each component can be estimated by comparing their impedances. The resistance of the hydrogel is $R_{gel} \sim 10^2 \Omega$, given the thickness ~1 mm, length ~1 cm and width ~1 cm, and resistivity $\sim 10^{-1}$ $\Omega$m. The capacitance per unit area of the EDL is $c_{EDL} \approx 10^{-1}$ Fm$^{-2}$ the area of the EDL is $A_{EDL} \approx 10^{-4}$ m$^2$, and the angular frequency is $\omega = 2\pi f = 2000\pi$, so that the impedance of the EDL is $$|Z_{EDL}| = \frac{1}{\omega c_{EDL} A_{EDL}} \approx 15 \Omega.$$

The capacitance of the dielectric (VHB) is $C_D = \varepsilon_{VHB} \varepsilon_0 A_{active}/d_{VHB} \approx 2.1 \times 10^{-9}$ F, where $\varepsilon_{VHB} = 4.7$ is the dielectric constant of the VHB, $\varepsilon_0 = 8.85 \times 10^{-12}$ Fm$^{-1}$ is the permittivity of vacuum, $d_{VHB} \sim 20$ μm is the thickness of VHB 4905 under a biaxial pre-stretch of ~5, and $A_{active} \sim 10^{-3}$ m$^2$ is the area of active region containing the cholesteric, so that the impedance of the dielectric is $$|Z_D| = \frac{1}{\omega C_D} \approx 7.65 \times 10^4 \Omega.$$

The cholesteric has the same thickness and area as the VHB layer. Whereas the orientation of the liquid-crystal molecules is random in the voltage off state and the isotropic (or average) dielectric constant of 5CB is $\varepsilon_{5CB}^{iso} \approx 11$, $\varepsilon_{5CB}^{\parallel} \approx 20$, the dielectric constant parallel to the director, is used for estimation, since the equilibrium state has liquid-crystal molecules parallel to the field. Capacitance and equivalent impedance of the liquid crystal layer are estimated as $C_{CLC} \approx 8.85 \times 10^{-9}$ F, $$|Z_{CLC}| = \frac{1}{\omega C_{CLC}} \approx 1.8 \times 10^4 \Omega.$$

For the applied voltage of 600 V, voltage drop across EDL is ~52.5 mV, which is much lower than the threshold voltage for electrolysis of water. The voltage drop on hydrogel is ~350.4 mV. The main voltage drops are on the cholesteric, ~63.1 V, and on the dielectrics, ~268.1 V for each VHB layer. The electric field in the dielectric is ~13.4 MV m$^{-1}$, which is much smaller than the electrical breakdown field of VHB (~100 MV m$^{-1}$). Similarly, the electric field in the cholesteric is below the electrical breakdown field of the cholesteric (~10 MV m$^{-1}$).

The applied voltage should be high enough to switch the liquid-crystal molecules from the twisted domains to the homeotropic state. The threshold electric field is given by $$E_{th} = \frac{\pi^2}{p} \sqrt{\frac{K_2}{\Delta\varepsilon\varepsilon_0}}.$$

For the 5CB/R-811 mixture, the twist elastic constant is $K_2=3\times10^{-12}$N, the dielectric anisotropy is $\Delta\varepsilon=13$, and the pitch is determined as $$p = \frac{1}{HTP \cdot c} \approx 2 \text{ }\mu\text{m},$$

where the HTP~10 $\mu$m$^{-1}$ is the helical twisting power of R-811 in 5CB, and c=5.0 wt % is the concentration of R-811. Consequently, the threshold electric field to unwind the cholesteric is $E_{th}$~0.8 MV m$^{-1}$. This estimate is consistent with our observation that the device becomes transparent at 350 V, which gives E~1.84 MV m$^{-1}$ in the cholesteric. See, FIG. 2D Similar to the dynamic process of the Frederiks transition in liquid crystals, the switch-on time $\tau_{on}$ scales as $$\frac{1}{\tau_{on}} \propto \frac{1}{\eta_{twist}} \left| \Delta\varepsilon\varepsilon_0 E^2 - \left(\frac{2\pi}{p}\right)^2 K_2 \right|,$$

where $\eta_{twist}$ is the rotational viscosity of liquid crystal. A large electric field E shortens the switch-on time. For the cholesteric of rotational viscosity $\eta_{twist}$~80 mPa s, the theoretical limit of switch on time can reach the order of 10$^{-5}$ s when the electric field is just below the electrical breakdown field of the liquid crystal 10 MV m$^{-1}$. The switch-on time in these experiments reach ~14 ms when the voltage is 1000 V. A faster response can be achieved under a higher voltage.

Switching off is a field-independent process of several stages. When the voltage is switched off, the liquid-crystal molecules transit from the homeotropic state to the planar state, and then from the planar state to the focal conic state. The dynamics of the nucleation process depends on the impurities in the cholesteric and irregularities on the dielectric surface. As expected, the measured switch-off time is a constant independent of the voltage applied. See, FIG. 2F. For comparison, a device using ITO glass as the electrode and VHB with similar thickness (~20 $\mu$m) as the spacer had a switch-off time constant at ~8.2 ms, at various applied voltage. Thus, the liquid-crystal devices using ionic conductors have similar electrooptical characteristics as those using electronic conductors.

The response time of the device is not limited by the resistivity of the hydrogels. The capacitors due to the dielectric elastomers, the liquid crystals and the EDLs are in series. The equivalent capacitance is dominated by the small capacitors of the dielectric and the liquid crystals, both of which are on the order of 10$^{-10}$ F; while the large capacitance due to the EDLs, which are on the order of 10$^{-5}$ F, is negligible. The resulting capacitance of the device C is ~10$^{-10}$ F. Resistance due to the hydrogel is $R_{gel}$~10$^2\Omega$. As a result, RC delay of the device is small, $\tau_{RC}$~10$^{-8}$ s, and will not contribute to the observed switching time of the device.

Figure 3A:
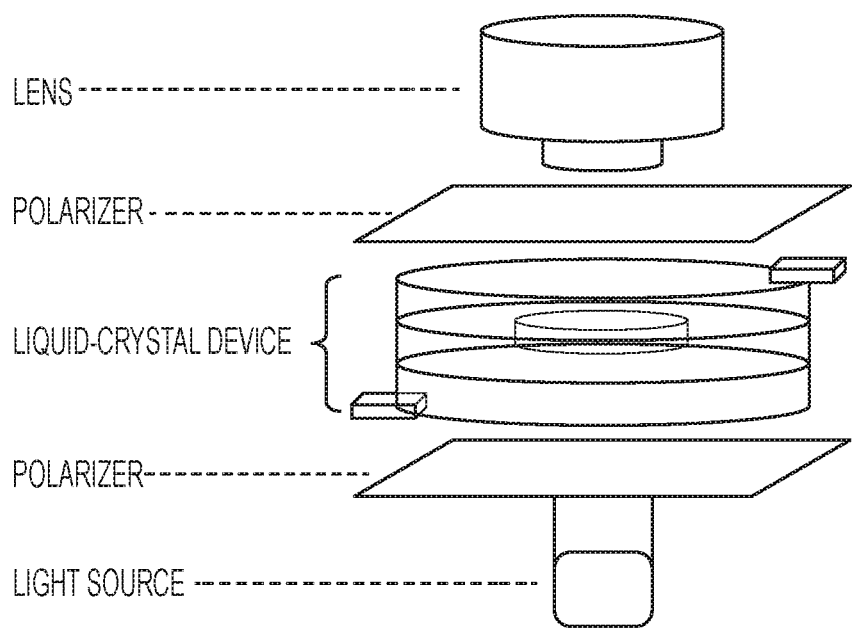
FIG. 3A is a schematic of the experimental setup used to observe the microscopic texture as a function of voltage of the liquid-crystal device under a microscope with one linear polarizer placed before the device, and with or without an analyzer after the device.
Figure 3B:
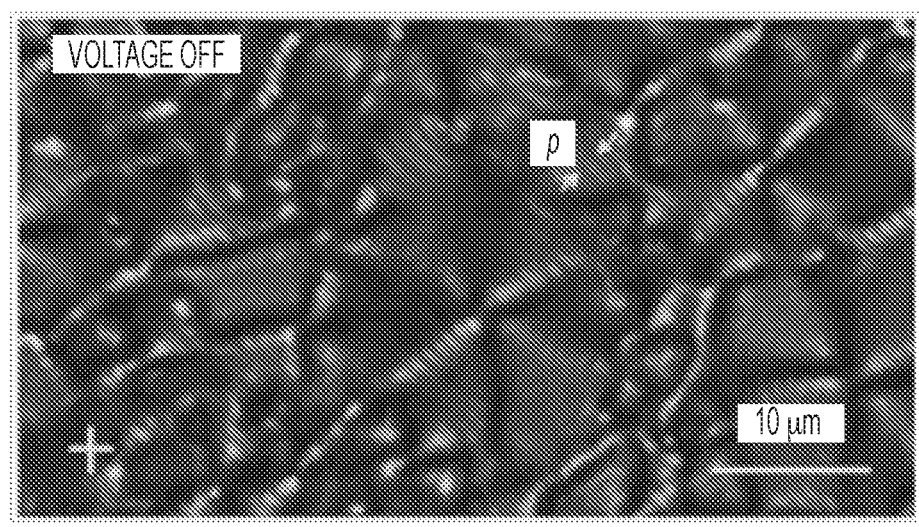
FIG. 3B is a photograph of focal conic texture of the cholesteric placed between perpendicular polarizers, observed at the voltage-off state.
Figure 3C:
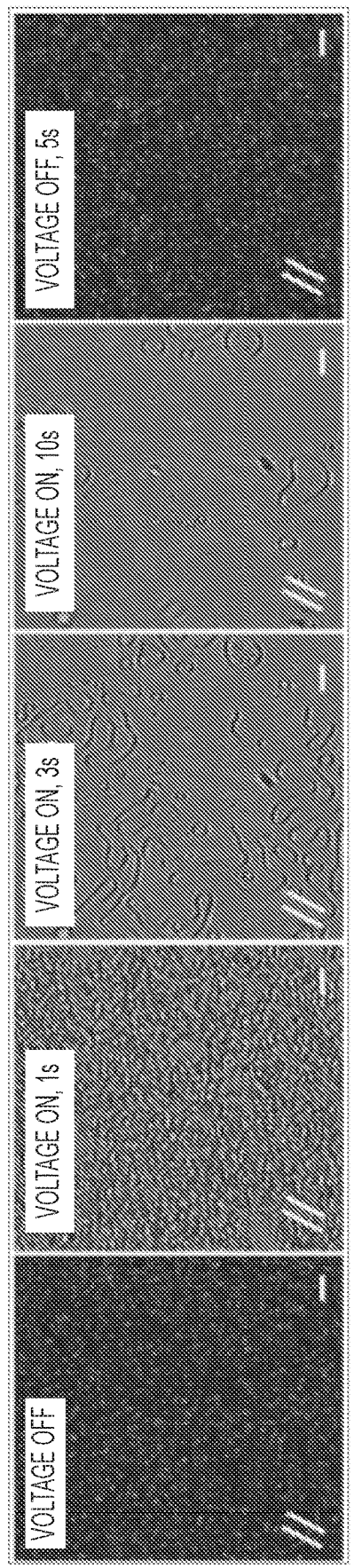
FIG. 3C is a time lapsed series of photographs showing the dynamic process of the cholesteric observed with parallel polarizers at voltage of amplitude 500 V and frequency 1 kHz.
Figure 3D:
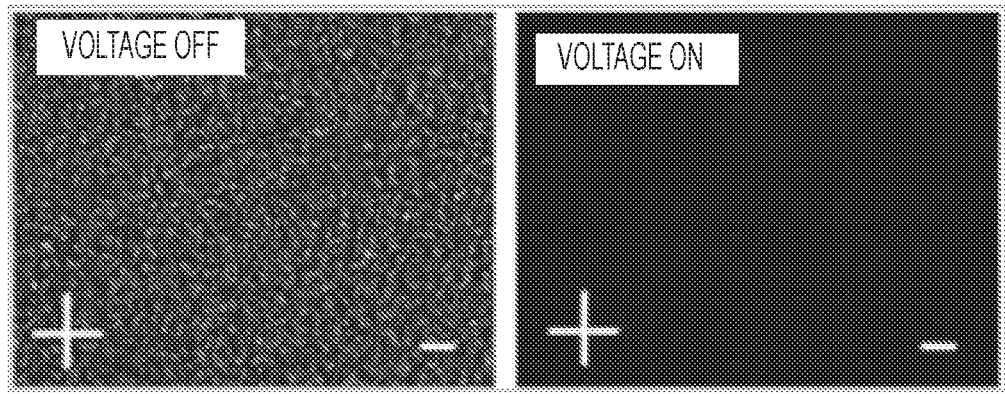
FIGS. 3D and 3E are photographs of a device according to one or more embodiments placed between perpendicular polarizers, or placed in the microscope without analyzer, observed at the voltage-off and voltage-on states. Scales bars in FIGS. 3C-3E indicate 100 μm.
Figure 3E:
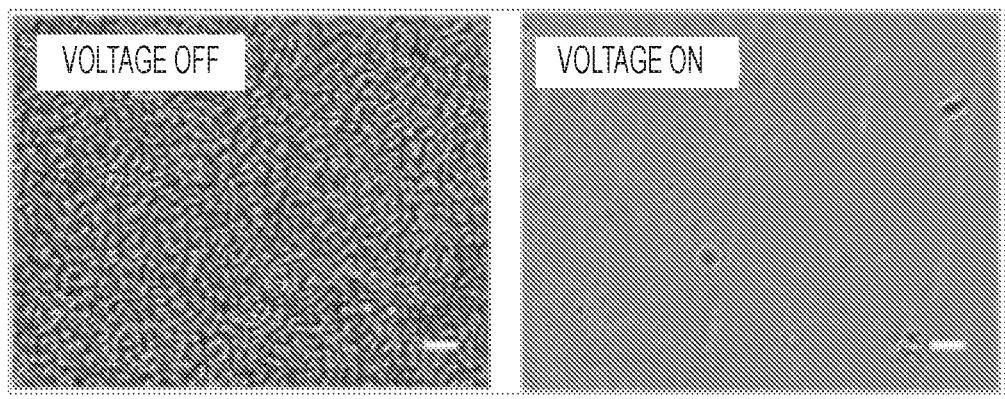

The change of the cholesteric texture as a function of voltage was confirmed by observation under a microscope with one linear polarizer placed before the device, and with or without an analyzer after the device. The experimental set up is show in FIG. 3A. In the absence of voltage, cholesteric forms focal conic texture, showing a pitch of ~2 $\mu$m, as shown in FIG. 3B. After the voltage is applied, the cholesteric domains unwind to align with the electric field. Homeotropic regions nucleate and grow with time. The remaining twisted domains form loops and threads; they decrease in length and gradually disappear. When the voltage is switched off, the twisted domains re-form. The dynamic process is observed when the device is placed between two parallel polarizers. Time sequence photographs of the cholesteric showing the unwinding of the crystal domains is shown in FIG. 3C. When the voltage is off, rotating the analyzer to be perpendicular to the polarizer or removing the analyzer does not affect the low intensity in the view, indicating a strong scattering of light by the focal conic domains. When the voltage is on, the device shows homogeneous black field of view with the analyzer in perpendicular orientation, or homogeneous bright field of view without analyzer, indicating that the homeotropic liquid-crystal molecules do not scatter or modulate the polarization of light. This is shown in FIGS. 3D and 3E, respectively.

Figure 4A:
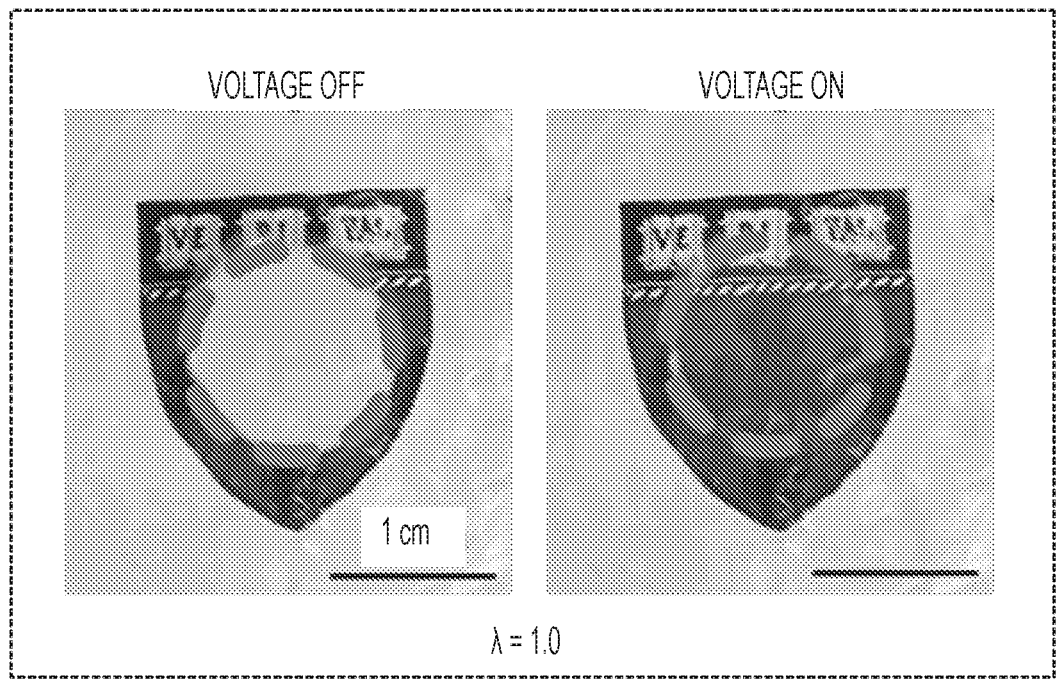
FIGS. 4A and 4B are photographs of a stretchable liquid-crystal device according to one or more embodiments showing (a) the device being switched in the undeformed state, λ=1.0; and (b) the device being switched in the stretched state, λ=1.5. The dashed circles indicate the area containing cholesteric.
Figure 4B:
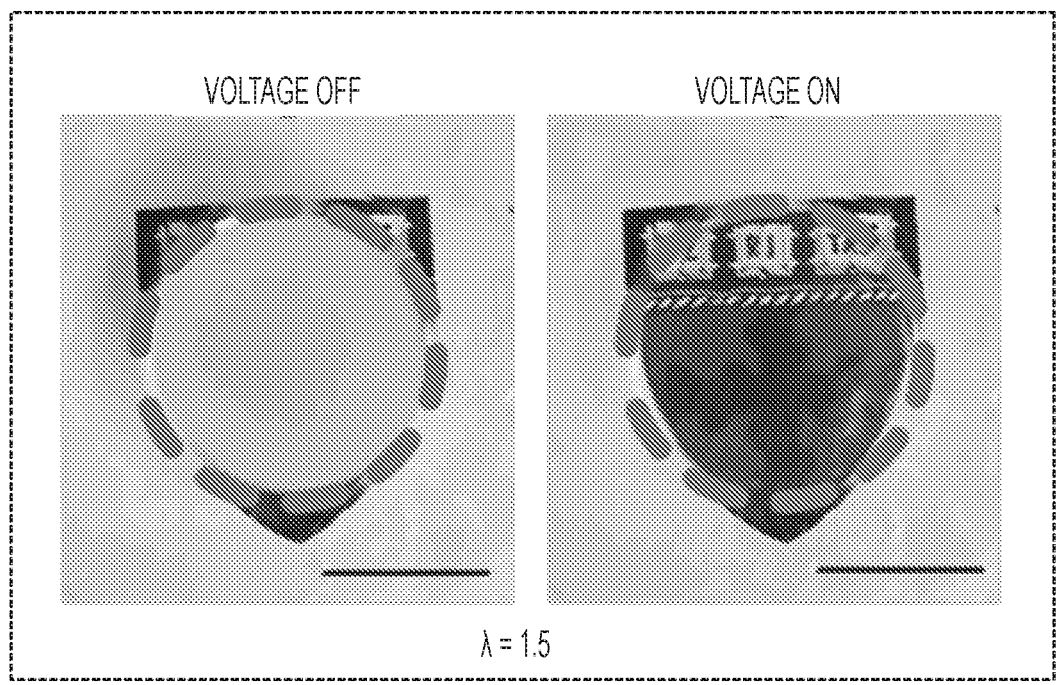

The electrooptical device is stretchable, as is demonstrated in FIGS. 4A-4E. Since a pre-stretch of ~1.3 is applied to the VHB before fabricating the device, this is regarded as the reference state. In the reference state, the thickness of the cholesteric is d=296 $\mu$m. $\lambda$ is defined as the stretch (e.g., the diameter of the device in the stretched state divided by that in the reference state). The device remains switchable at both the reference state $\lambda=1.0$ and in the stretched state $\lambda=1.5$, as is shown in FIGS. 4A and 4B, respectively.

Figure 4C:
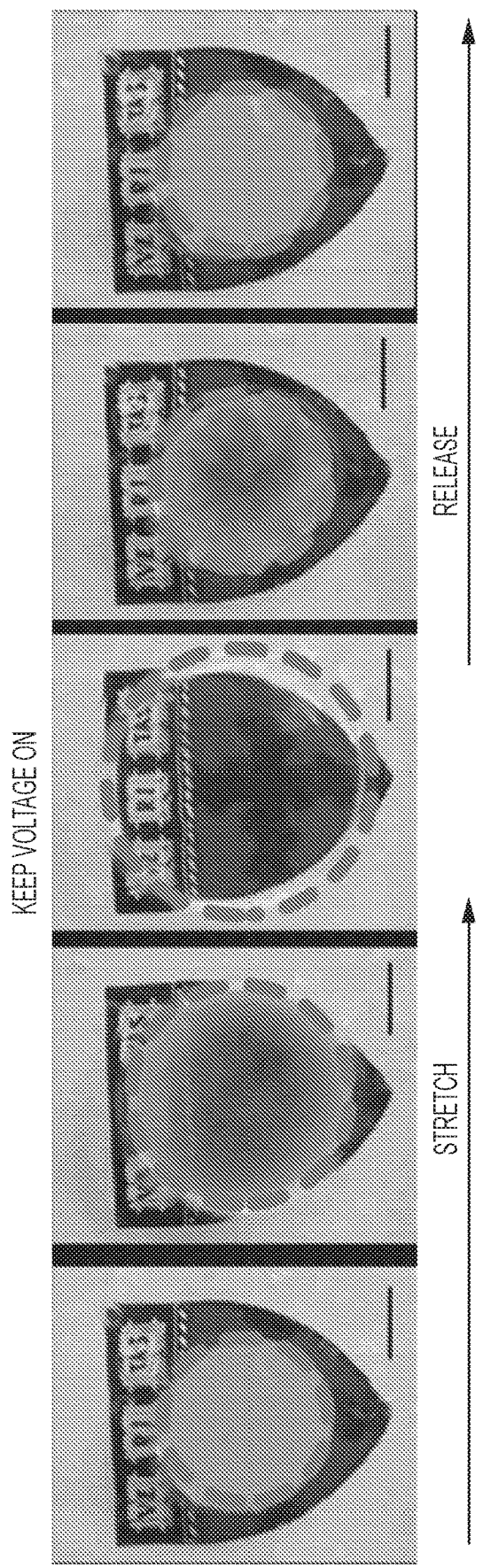
FIG. 4C is a time sequence series of photographs showing the transparency changes in a cycle of stretching and releasing of a stretchable liquid-crystal device according to one or more embodiments. A square-wave voltage of amplitude 1200 V and frequency 1 kHz is applied during the whole process.

The device according to one or more embodiments, can be activated by stretching or mechanical deformation. This is a new mode of operation, not possible with conventional liquid crystal devices. As is illustrated in FIG. 4C, the light shutter is switchable in response to a combined electrical voltage and mechanical force. In FIG. 4C, the device is held at a constant subthreshold voltage of 1200V and then is stretched, e.g., subjected to mechanical deformation. When the device is in the reference (unstretched) state, the active area remains opaque, shown the photograph on the far left in FIG. 4C. The device then is stretched to a larger area, without changing the voltage. As is seen moving along the arrow or increasing stretch, the active area becomes partially, and then fully, transparent. Releasing the stretch returns the device to opaqueness. Since the transmittance as a function of electric field is steep (a small change in voltage causes a large change in transmission up to saturation), the use of a combination of voltage and mechanical deformation can increase the sensitivity of the device. In such, an electromechanical light shutter switches on and off at narrow range of voltage and stretch.

When the device is pulled by an equal-biaxial stretch A, the thickness of the device reduces by a factor of $\lambda^2$, and the switching voltage is also reduced by a factor of about $\lambda^2$. This is demonstrated in FIG. 4D, which shows that the threshold voltage was reduced from about 1.95 kV to about 0.9 kV on stretch from reference $\lambda$ to 1.5$\lambda$. The inset shows that the relation between the transmittance and the product $V_0\lambda^2$ remains nearly the same for different values of $\lambda$.

Figure 4D:
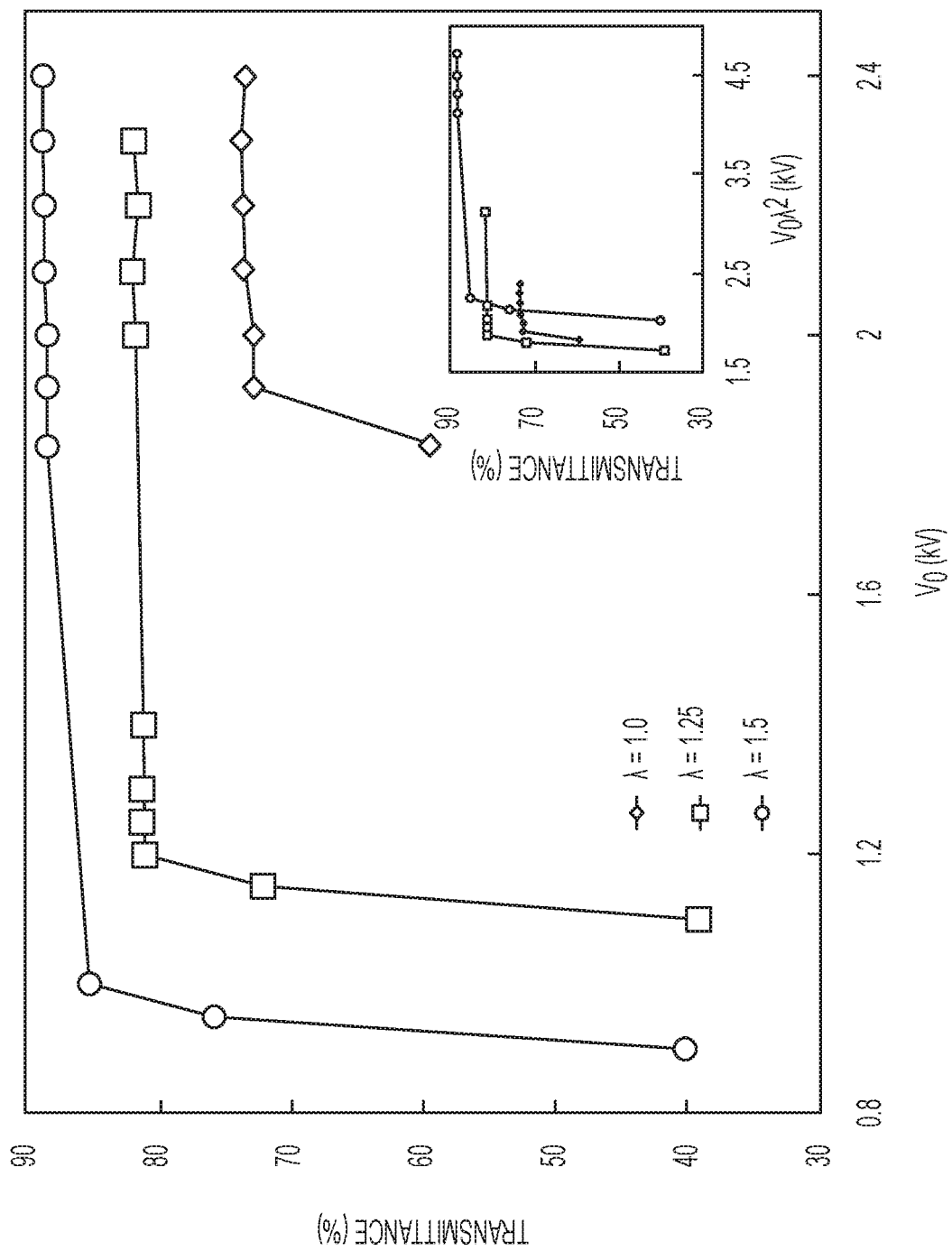
FIG. 4D is a plot of % transmittance vs. voltage showing transmittance as a function of voltage at several values of stretch; the maximum transmittance increases while the threshold voltage for switching decreases as λ increases. Inset: the transmittance as a function of electric field intensity.
Figure 4E:
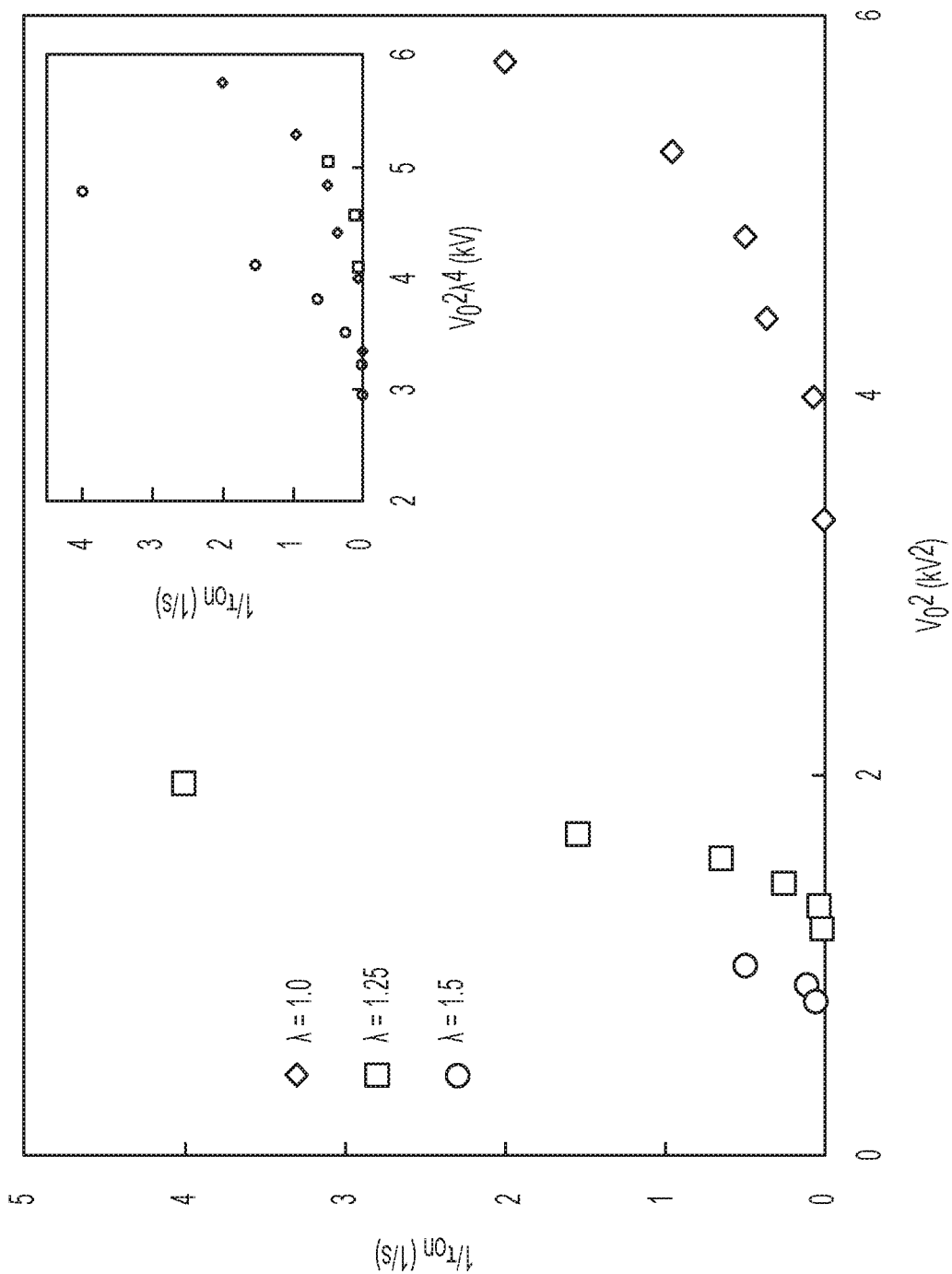
FIG. 4E is a plot of $1/\tau_{on}$ as a function of voltage squared at various λ. Inset: $1/\tau_{on}$ as a function of electric field squared.

The small difference between the three curves in the inset of FIG. 4D may be due to the elastic deflection of the dielectric and the hydrodynamic flow of the cholesteric, driven by the Maxwell stress. This elastohydrodynamic-electrooptical coupling can be minimized by reducing the radius of the dielectric cell. Alternatively, the elastohydrodynamic-electrooptical coupling can enable devices of new functions.

When the device is stretched, the same applied voltage can switch the device much faster. Since thinning of the cholesteric increases the electric field by a factor of $\lambda^2$, $1/\tau_{on}$ will increase by a factor of $V_0^2\lambda^4$. In the experiments, $\tau_{on}$ does show a significant decrease as $V_0$ or $\lambda$ increases (FIG. 4E), although $1/\tau_{on}$ does not strictly follow a linear relationship with $V_0^2\lambda^4$ (FIG. 4E, inset), especially when the voltage is higher or the stretch is larger. The deviation is also likely caused by the elastohydrodynamic effect.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments. Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise.

It will be appreciated that while a particular sequence of steps has been shown and described for purposes of explanation, the sequence may be varied in certain respects, or the steps may be combined, while still obtaining the desired configuration. Additionally, modifications to the disclosed embodiment and the invention as claimed are possible and within the scope of this disclosed invention.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A stretchable electrooptical device, comprising:
   a liquid crystal cell comprising a liquid crystal disposed between a first ionic conducting gel layer and a second ionic conducting gel layer, wherein the liquid crystal defines an active region of the device, said active region capable of being switched from opaque to transparent; and
   a first electronic conductor in electrical contact with the first ionic conducting gel layer and a second electronic conductor in electrical contact with the second ionic conducting gel layer, said first and second electronic conductors connectable to an external voltage source, wherein when the active region is transparent, the stretchable electrooptical device is transparent from the first ionic conducting gel layer to the second ionic conducting gel layer.

2. The device of claim 1, wherein the liquid crystal cell further comprises a dielectric layer and the liquid crystal is enclosed in the dielectric layer.

3. The device of claim 2, wherein the dielectric layer comprises an elastomer.

4. The device of claim 1, wherein each of the first ionic conducting gel layer and the second ionic conducting gel layer comprises an elastomeric hydrogel.

5. The device of claim 4, wherein the elastomeric hydrogel comprises an electrolyte.

6. The device of claim 1, wherein each of the first ionic conducting gel layer and the second ionic conducting gel layer comprises an ionomer.

7. The device of claim 1 wherein the liquid crystal cell comprises a liquid crystal layer that is immiscible with each of the first ionic conducting gel layer and the second ionic conducting gel layer.

8. The device of claim 2, wherein the dielectric layer enclosing the liquid crystal is in contact with the first ionic conducting gel layer and the second ionic conducting gel layer outside the active region.

9. The device of claim 1, wherein the device is selected from the group consisting of liquid crystal displays (LCDs), universal optical phase modulator, beam steering device, tunable Fresnel lens, broad-spectrum tunable color reflector and nanosecond light modulator.

10. A method of switching a stretchable electrooptical device, comprising:
    providing a stretchable electrooptical device, wherein the stretchable electrooptical device comprises:

a liquid crystal cell comprising a liquid crystal disposed between a first ionic conducting gel layer and a second ionic conducting gel layer, wherein the liquid crystal defines an active region of the device, said active region capable of being switched from opaque to transparent; and a first electronic conductor in electrical contact with the first ionic conducting gel layer and a second electronic conductor in electrical contact with the second ionic conducting gel layer, said first and second electronic conductors connectable to an external voltage source; and applying a threshold voltage to the stretchable electrooptical device, wherein the threshold voltage is sufficient to switch the active region from opaque to transparent, such that the stretchable electrooptical device is transparent from the first ionic conducting gel layer to the second ionic conducting gel layer.

11. The method of claim 10, further comprising stretching the stretchable electrooptical device.

12. The method of claim 11, wherein the stretchable electrooptical device is stretched to up to 125% area strain.

13. The method of claim 11, wherein the stretching comprises biaxially stretching the device.

14. The method of claim 11, wherein the threshold voltage needed to switch the active region is reduced by pre-stretching the device.

15. The method of claim 11, wherein the threshold voltage for switching decreases as the device is stretched.

16. A method of switching a stretchable electrooptical device, comprising:

providing a stretchable electrooptical device, wherein the stretchable electrooptical device comprises:

a liquid crystal cell comprising a liquid crystal disposed between a first ionic conducting gel layer and a second ionic conducting gel layer, wherein the liquid crystal defines an active region of the device, said active region capable of being switched from opaque to transparent, wherein the liquid crystal cell is transparent when the active region is transparent; and a first electronic conductor in electrical contact with the first ionic conducting gel layer and a second electronic conductor in electrical contact with the second ionic conducting gel layer, said first and second electronic conductors connectable to an external voltage source; and applying a constant voltage to the device, wherein the voltage is below a threshold voltage sufficient to switch the active region from opaque to transparent; and applying a mechanical strain to the device to stretch the device, wherein the active region switches from opaque to transparent, such that the stretchable electrooptical device is transparent from the first ionic conducting gel layer to the second ionic conducting gel layer.

* * * * *

UNITED STATES PATENT AND TRADEMARK OFFICE
CERTIFICATE OF CORRECTION

PATENT NO. : 11,175,544 B2
APPLICATION NO. : 16/491106
DATED : November 16, 2021
INVENTOR(S) : Canhui Yang et al.

It is certified that error appears in the above-identified patent and that said Letters Patent is hereby corrected as shown below:

In the Specification

At Column 1, Line numbers 16-22, please amend the paragraph entitled "Statement Regarding Federally Sponsored Research or Development" as follows:
This invention was made with government support under 1420570 awarded by National Science Foundation (NSF). The government has certain rights in this invention.

Signed and Sealed this
Twenty-fifth Day of October, 2022

Katherine Kelly Vidal
*Director of the United States Patent and Trademark Office*